United States Patent [19]

Newhouse

[11] 4,061,047
[45] Dec. 6, 1977

[54] PULLEY HALF MOUNTING OF VARIABLE SPEED PULLEY

[75] Inventor: Thomas Charles Newhouse, Beaver Dam, Wis.

[73] Assignee: Deere & Company, Moline, Ill.

[21] Appl. No.: 724,631

[22] Filed: Sept. 20, 1976

[51] Int. Cl.² .............................................. F16H 55/52
[52] U.S. Cl. ............................. 74/230.17 C; 74/230.3
[58] Field of Search ................ 74/230.17 C, 230.16, 74/230.3, 230.17 A, 230.17 B, 230.17 R; 29/159 R

[56] References Cited

U.S. PATENT DOCUMENTS

| | | | |
|---|---|---|---|
| 2,153,151 | 4/1939 | Morella | 74/230.17 C |
| 2,639,621 | 5/1953 | Harris et al. | 74/230.17 C |
| 2,773,393 | 12/1956 | Firth | 74/230.17 C |
| 3,094,320 | 6/1963 | Huck | 74/230.17 C |
| 3,842,637 | 10/1974 | Wilson | 74/230.17 A |
| 3,967,509 | 7/1976 | Teal | 74/230.17 A |

Primary Examiner—Samuel Scott
Assistant Examiner—Allan R. Burke

[57] ABSTRACT

A variable speed pulley includes a pair of pulley halves with each half including a central hub portion, defining an annular tapered mounting surface, and a belt engaging formed-plate portion provided with a flanged opening press fit on the mounting surface of the hub. The taper mounting surface of the hub is oriented such that axial forces imposed by the drive belt on the formed-plate portion will tend to wedge the latter even tighter on the hub.

3 Claims, 1 Drawing Figure

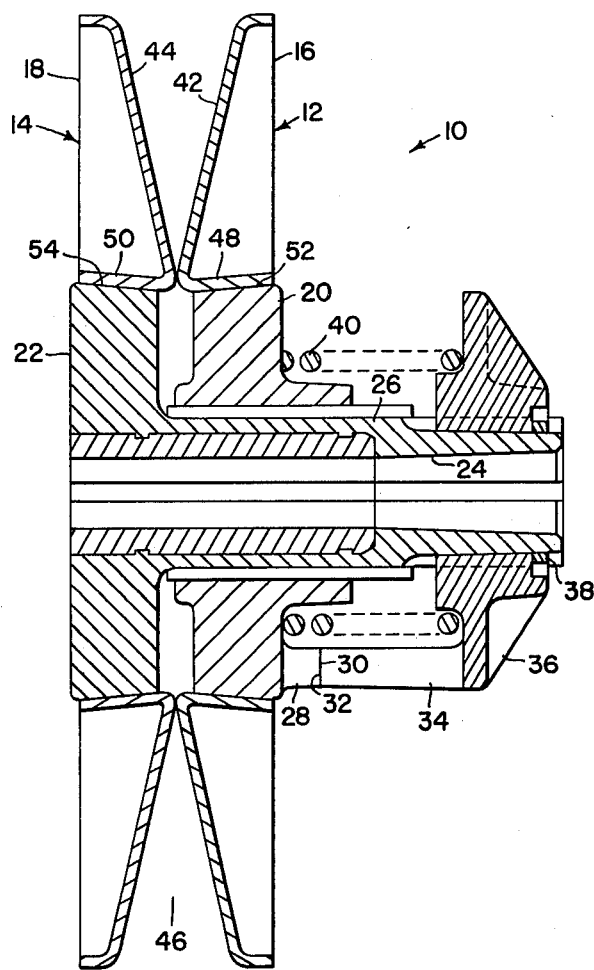

PULLEY HALF MOUNTING OF VARIABLE SPEED PULLEY

BACKGROUND OF THE INVENTION

The present invention relates to a variable speed pulley and more specifically relates to pulley half construction for such a pulley.

It is common practice to construct each of the pulley halves of a variable speed pulley by stamping or otherwise forming a plate such that it defines a belt engaging surface and to rivet the formed plate to a central hub. This type of pulley half construction is not entirely satisfactory since under high speeds and forces the rivets of the pulley half tend to loosen resulting in failure of the formed plate in the area of the rivets and/or in the belt engaging face of the formed plate separating from belt engagement.

SUMMARY OF THE INVENTION

According to the present invention there is provided a variable speed pulley having novelly constructed pulley halves.

An object of the invention is to provide a pulley half having a formed plate belt engaging portion releasably fixed to a central hub portion in a simple effective manner.

A more specific object is to provide a pulley half including a formed plate releasably fixed to a central hub without the use of fasteners.

Still another object of the invention is to provide a pulley half constructed, as set forth in the immediately preceding object, wherein the connection between the formed plate and hub tends to become tightened during use by the axial force imposed on the formed plate by the drive belt.

Yet another object of the invention is to provide a pulley half including a hub defining a tapered mounting surface and a formed plate having a flanged central opening press fit on the tapered mounting surface.

These and other objects will become apparent from a reading of the ensuing description in conjunction with the appended drawing.

BRIEF DESCRIPTION OF THE DRAWING

The sole FIGURE is a vertical sectional view taken through the longitudinal axis of a pulley constructed according to the principles of the present invention.

DESCRIPTION OF THE PREFERRED EMBODIMENT

Referring to the drawing, therein is shown a variable speed pulley 10 comprising right and left pulley halves 12 and 14, respectively. The pulley halves 12 and 14 include outer annular belt engaging sections respectively defined by formed plates 16 and 18 mounted on respective inner hubs 20 and 22, in a manner described hereinbelow. The hub 22 is provided with a central longitudinal bore 24 adapted to be received on and fixed to a drive train shaft (not shown). The hub 22 includes a rightward extension 26 on which the hub 20 is axially slidably and rotatably mounted. The hub 20 has three equiangularly spaced rightward projections 28 (only one shown) having respective rightwardly facing inclined cam surfaces 30 thereon and engaged with each of the surfaces 30 is a complimentary surface 32 of respective leftward projections 34 of a cam member 36 received on the right end portion of the extension 26 and fixed for rotation therewith by interengaged splines. A snap ring 38 is received in a groove adjacent the right end of the extension 26 and engages a leftward facing surface of the member 36 to retain the latter on the extension. Compressed between and having its opposite ends respectively anchored to the hub 20 and member 36, in a conventional manner (not shown) is a coil compression spring 40 which acts to bias the hub 20 toward an extreme leftward position adjacent the hub 22, the hub 20 being shown in this extreme position in the drawing.

The construction of the formed plates 16 and 18 and their respective connection with the hubs 20 and 22 will now be described in more detail as it is in this area where the present invention lies. Thus, the formed plates 16 and 18 are identical and include respective opposed conically shaped belt engaging surfaces 42 and 44 which diverge radially outwardly from each other so as to define a belt receiving groove 46. The surfaces 42 and 44 respectively, terminate radially inwardly at respective central openings defined by axially extending annular flanges 48 and 50. The hubs 20 and 22 respectively include outwardly facing mounting surfaces 52 and 54 which are tapered such as to respectively lie on imaginary cones having their respective apices located leftwardly and rightwardly of the pulley 10 on the longitudinal axis thereof. The angle of taper is preferably between 5° and 10°. The flanges 48 and 50 are cylindrical before being press fit on the surfaces 52 and 54 and define respective openings having diameters approximately the same as the smallest diameters of the surfaces 52 and 54.

It will be appreciated then that during operation the axial and torsional forces imposed on the formed plates 16 and 18 by a drive belt wedged between the surfaces 42 and 44 will tend to tighten the grip of the flanges 48 and 50 on the hub surfaces 52 and 54.

I claim:

1. In a variable speed pulley including first and second pulley halves respectively including first and second belt engaging portions connected to first and second hubs adapted for being mounted on a drive shaft for rotation therewith with the first hub being axially fixed on the shaft and the second hub being axially slidable on the shaft; the improvement comprising: said first and second hubs respectively defining first and second annular outer conically tapered surfaces with the first tapered surface inclined radially outwardly in a direction away from the second hub and with the second tapered surface being inclined radially outwardly in a direction away from the first hub; and said first and second belt engaging portions respectively including first and second centrally located openings defined by first and second axially extending flanges respectively press fit onto said first and second inclined surfaces.

2. The variable speed pulley defined in claim 1 wherein the taper of each of the first and second inclined surfaces is in the neighborhood of between 5° and 10°.

3. The variable speed pulley defined in claim 1 wherein said first and second flanges are cylindrical and have respective inside diameters which, prior to being received on the tapered surfaces are cylindrical and substantially equal to the smallest diameter of the tapered surfaces.

* * * * *